United States Patent [19]

Eisenloffel

[11] Patent Number: 4,676,686
[45] Date of Patent: Jun. 30, 1987

[54] CORNER CLAMP FOR A PICTURE FRAME

[76] Inventor: Adolf Eisenloffel, 6298 Adair Dr., Brookpark, Ohio 44142

[21] Appl. No.: 898,634

[22] Filed: Aug. 21, 1986

[51] Int. Cl.$^4$ .......................... F16B 12/50; G09F 1/12
[52] U.S. Cl. .................................... 403/402; 403/295; 40/155
[58] Field of Search ............... 403/401, 402, 292, 295; 40/155

[56] References Cited

U.S. PATENT DOCUMENTS

| | | | |
|---|---|---|---|
| 3,900,269 | 8/1975 | Pavlot | 403/292 |
| 3,922,807 | 12/1975 | Shore | 403/295 X |
| 4,305,677 | 12/1981 | Kowalski | 403/295 |
| 4,538,936 | 9/1985 | Zeidl | 403/402 |

Primary Examiner—Andrew V. Kundrat

[57] ABSTRACT

A clamping device for holding framing members of a metal picture frame in fixed rectangular relation, is described as being formed of lightweight steel and having an L-shape formed of two legs, each of which is U-shaped. Means coacting between the device and framing members are provided to secure the device in place where it holds a pair of adjacent framing members in mitered relation.

The clamping device is also utilized to clamp a picture frame holder to one of the framing members.

7 Claims, 6 Drawing Figures 4,676,686

CORNER CLAMP FOR A PICTURE FRAME

BACKGROUND OF INVENTION

The invention relates to picture frames, especially to a clamping device which is used to reinforce and hold together the mitered corners of a metal picture frame that has a rearwardly facing slot or channel which extends longitudinally of each of the framing members of which the picture frame is made.

At present, one or more rigid, L-shaped, flat metal plates with set screws are used in the mitered corners of adjacent framing members to hold the corners together. Such plates are cast and provide limited frictional engagement with the framing members at the edges of the plates. The invention is designed to provide an improved corner clamping device which has greater surface contact with the framing members to produce greater stability, and a more economically manufactured device which is stamped from lightweight spring steel.

SUMMARY OF INVENTION

Briefly stated, the invention is in a clamping device which comprises an L-shaped member which is composed of two outstanding legs, each of which has a U-shaped cross-section which is matingly configured to slidably fit into the rearwardly facing channel of each framing member. The clamping device is provided with means which coact between the L-shaped member and channel to secure the clamping device in miter holding relation with adjacent framing members.

An extension of the invention is in a picture frame holding device which utilizes the aforesaid means and a single U-shaped leg in conjunction with an outstanding plate hanger that is provided with a hole for receipt of a nail, wire cord, or other means by which the picture frame is hung on a wall.

DESCRIPTION OF DRAWING

The following description of the invention will be better understood by having reference to the accompanying drawing, wherein.

ENVIRONMENT OF INVENTION

Figure 1:
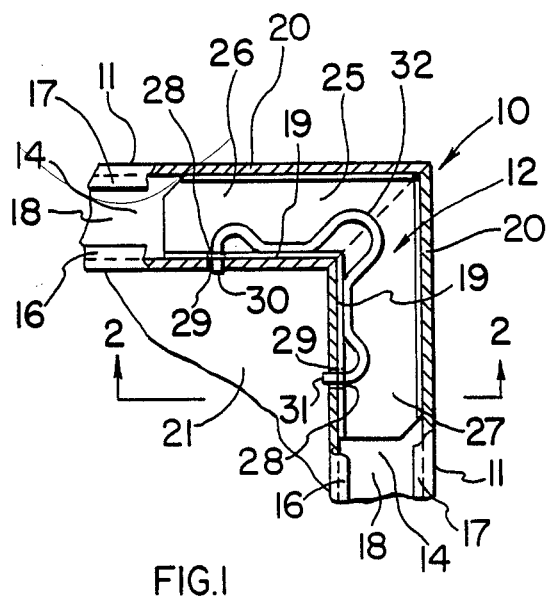
FIG. 1 is a plan view of a mitered corner of a picture frame which utilizes one embodiment of the invention; portions of the frame being removed to show the invention.
Figure 2:
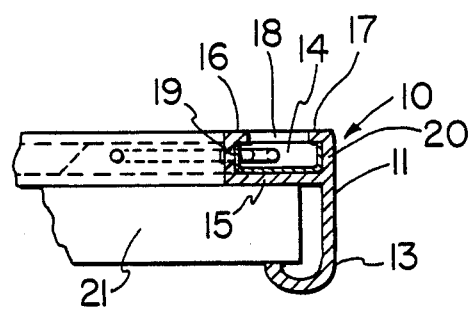
FIG. 2 is a section viewed from the plane 2—2 of FIG. 1.

With general reference to the drawing for like parts and specific reference to FIGS. 1 and 2, there is shown a metal picture frame 10 which is composed of four, identical framing members, e.g. member 11, which are held in mitered, rectangular relation by means of a clamping device 12 in each corner of the picture frame 10.

As best seen in FIG. 2, each framing member 11, in cross-section, comprises a generally J-shaped side and front portion 13 with a rearwardly facing channel 14 that has a flat bottom wall 15 which is in opposed parallel relation with a pair of planer flanges 16, 17 that are separated by an opening 18 between them. The flanges 16, 17 are connected to the bottom wall 15 by an inner sidewall 19 and a longer, parallel outer sidewall 20 to form the frame 10 in which a picture 21 is mounted.

THE INVENTION

The clamping device 12, shown in FIGS. 1 and 2, comprises a rigid, L-shaped reinforcement plate 25 which, in this embodiment, is designed to rest against the bottom wall 15 of the channel 14. The plate 25 has, a pair of outstanding legs 26, 27 each of which has a U-shaped cross-section for sliding, mating reception in the channel 14 of the adjacent framing member 11. The legs 26, 27 each have a pinhole 28 which is axially aligned with a similar pinhole 29 in the closest, inner sidewall 19 of the adjacent framing member 11, when the legs 26, 27 are properly positioned within the channels 14 of two mitered framing members 11. The aligned pinholes 28, 29 are designed to receive the opposing free ends or tips 30, 31 of a lock spring 32 which is formed of spring steel and designed to hold the clamping device 12 firmly interlocked with the adjacent framing members 11, until the tips 30, 31 of the lock spring 32 are manually removed from the pinholes 28, 29. The lock spring 32 is bent from wire which has a circular cross-section and a diameter that is slightly smaller than the diameter of the aligned pinholes 29, 30. The lock spring 32 is snapped into position by moving the tips 30, 31 further apart and then allowing the tips 30, 31 to resiliently spring-back into the pinholes 28, 29, as shown in FIG. 1, where at least portions of the lock spring 32 contact the adjacent sidewalls of the legs 26, 27.

Figure 3:
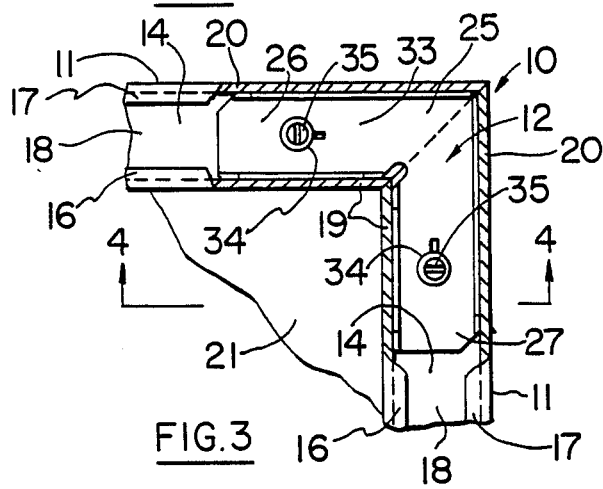
FIG. 3 is a similar plane view of a mitered corner which employs another embodiment of the invention.
Figure 4:
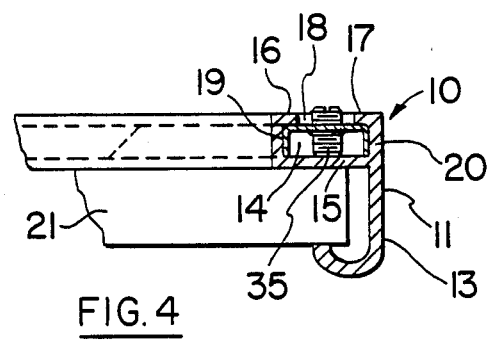
FIG. 4 is a section viewed form the plane 4—4 of FIG. 3.

The embodiment of the clamping device 12, shown in FIGS. 3 and 4, has a reinforced plate 33 which is identical to that previously described, except for the pinholes and the means for securing the plate 33 to the framing members 11, which means is not a snap lock spring 32, but a specially punched hole 34 in each of the legs 26, 27 for threadably receiving a conventional set screw 35 which is rotated against the bottom wall 15 of the channel 14 to force the legs 26, 27 away from the bottom wall 15 into compressive engagement with the flanges 16, 17 of the channel 14. It can be appreciated that the U-shape of the legs 26, 27 adds greater rigidity and stability to the mitered connection than legs 26, 27 of flat plates of the prior art. A comparison of FIGS. 2 and 4 reveals that the positions of the U-shaped legs 26, 27 within the channels 14 are in inverted relationship, i.e. the plate 33 of FIGS. 3 and 4 can be more appropriately said to rest against the flanges 16, 17 of the channels 14, rather than the bottom wall 15.

Figure 5:
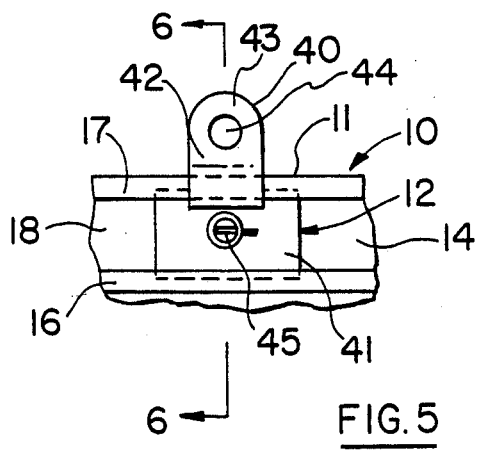
FIG. 5 is a plan view of a portion of a picture frame and hanger which employs the invention for securing the hanger to the frame.
Figure 6:
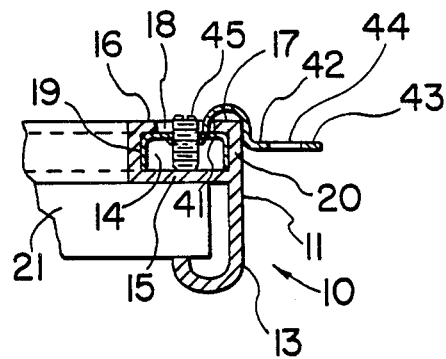
FIG. 6 is a section viewed from the plane 6—6 of FIG. 5.

With particular reference to FIGS. 5 and 6, there is shown a picture frame holder 40 which comprises an identical U-shaped leg 41 from which extends a hanger 42 which is curved adjacent the leg 41 to partially wrap around and engage the adjacent flanges, and which terminates at a flat distal end 43 that has an opening 44 which is designed to receive a wire hanging cord, if two such holders 40 are used at either side of the picture frame, or a nail or other device which is fastened to a wall to which the picture frame is hung. A similar set screw 45 is provided to attach the leg 41 to the framing member 11.

Thus, there has been described a highly improved clamping device which has U-shaped legs that are designed to fit snugly within the open channel that is formed along the back end of the framing members. A snaptype locking spring, or set screw is used to secure the device to a pair of mitered framing members. The inventive concept is also used to fasten a picture frame holder to such framing members.

What is claimed is:

1. A clamping device used in connection with a picture frame that is comprised of framing members, each of which has a channel that is defined by a bottom wall, a pair of parallel sidewalls extending from the bottom wall, and a pair of flanges with an opening therebetween extending from the sidewalls in parallel relation with the bottom wall, the device comprising:
   (a) a pair of legs at right angles to each other to form an L-shaped device, each of the legs having a U-shaped cross-section, the legs being dimensioned to matingly fit in the channels of adjacent, mitered framing members and being slidable therein, the legs resting against the bottom walls of the members; and
   (b) means coacting between the legs and adjacent framing members for securing the legs within the channels of the members, the means including, (i) a pair of aligned pinholes in adjacent walls of each leg and channel, and (ii) a resilient lock spring having a pair of opposing ends for mating reception in the aligned pinholes to secure the legs to adjacent framing members such that the members are clamped together in mitered relation.

2. The clamping device of claim 1, wherein the pinholes are in shorter innerwalls of the legs and channels closest a picture when mounted in the frame, and the lock spring is generally L-shaped and has a circular cross-section and formed of spring steel, the spring being shaped such that portions of the spring contact inner walls of the legs, when the spring is in interlocked relation with the legs and framing members.

3. A clamping device used in connection with a picture frame that is comprised of framing members, each of which has a channel that is defined by a bottom wall, a pair of parallel sidewalls extending from the bottom wall, and a pair of flanges with an opening therebetween extending from the sidewalls in parallel relation with the bottom wall, the device comprising:
   (a) at least one leg which has a U-shaped cross-section which is in inverted relation to the adjacent flat bottom of the channel when the leg is in the channel, the leg being dimensioned to matingly fit in the channel and being slidable therein;
   (b) means coacting between the at least one leg and adjacent framing member for securing the leg within the channel of the member, the means including an opening in the leg for threadably receiving a threaded screw which is rotatable in the opening into and out of engagemant with the flat bottom of the channel to move the leg into compressive engagement with the flanges; and
   (c) means coacting with the leg by which the picture frame can be hung on a vertical flat surface, such as a wall.

4. The clamping device of claim 3, wherein the frame hanging means includes a hanger extending from the leg and shaped to partially wrap around and engage an adjacent flange and extend therefrom and terminate at a distal end which has an opening therein.

5. A clamping device used to clamp together in rectangular mitered corner relationship, a plurality of metal picture framing members, each of which has a rearwardly facing channel, relative to the face of a picture in the frame, that is defined by, (i) a flat bottom wall parallel to the face of the picture, (ii) a pair of flat, parallel sidewalls extending rearwardly from the bottom wall and picture face at right angles from the bottom wall, and (iii) a pair of planar flanges connected to the sidewalls in parallel relation with the bottom wall in farther spaced relation from the picture face than the bottom wall, the flanges having a longitudinally extending opening between them, the device comprising:
   (a) an L-shaped plate for reinforcing each mitered corner of the frame, the plate being positionable in the channels of adjacent framing members and having two legs at right angles to each other, each leg having a U-shaped cross-section which is matingly configured and inverted to face the picture face so as to fit in close proximity to the sidewalls and flanges of the channels, each leg having an opening between the flanges in spaced relation from the bottom wall; and
   (b) a threaded screw threadably engaged in each opening and rotatable therein to and from the bottom wall, each screw having a threaded portion which is longer than the spacing between the flanges and bottom wall, so that the screw can engage the bottom wall and force the legs away from the bottom wall into compressive engagement with the flanges.

6. A clamping device used to clamp together in rectangular mitered corner relationship, a plurality of metal picture framing members, each of which has a rearwardly facing channel, relative to the face of a picture in the frame, that is defined by, (i) a flat bottom wall, (ii) a pair of flat, parallel sidewalls extending at right angles from the bottom wall, and (iii) a pair of planar flanges connected to the sidewalls in parallel relation with the bottom wall, the flanges having a longitudinally extending opening between them, the device comprising:
   (a) an L-shaped plate for reinforcing each mitered corner of the frame, the plate being positionable in the channels adjacent framing members and having two legs at right angels to each other, each leg having a U-shaped cross-section which is matingly configured to fit in close proximity to the bottom wall and sidewalls of the channels, each leg having a pinhole for axial alignment with an identical pinhole in the sidewall of the channel closest the picture when a picture is in the frame and the plate is properly positioned in the channels; and
   (b) a resilient lock spring composed of spring steel, and having a cross-section and a generally L-shape, the spring having a pair of opposing ends which are positionable in the opposing pinholes to lock the plate to the adjacent framing members when the ends are resiliently moved apart and allowed to snap back into the pinholes.

7. A clamping device used to clamp together in rectangular mitered corner relationship, a plurality of metal picture framing members, each of which has a rearwardly facing channel, relative to the face of a picture in the frame, that is defined by, (i) a flat bottom wall, (ii) a pair of flat, parallel sidewalls extending at right angles from the bottom wall, and (iii) a pair of planar flanges connected to the widewalls in parallel relation with the bottom wall, the flanges having a longitudinally extending opening between them, the device comprising:
 (a) a plate positionable in the channel of a framing member, the plate having a U-shaped cross-section which is matingly configured to fit in close proximity to the sidewalls and flanges of the channel, the plate having an opening between the flanges in spaced relation from the bottom wall;
 (b) a threaded screw threadably engaged in the opening and rotatable to and from the bottom wall to engage the bottom wall and force the plate into compressive engagement with the flanges; and
 (c) a hanger extending from the plate and curved to partially wrap around and engage on adjacent flange, the hanger terminating at a free distal end which is spaced from said flange and has an opening therein.

* * * * *